US012794885B2

(12) United States Patent
Cheethirala et al.

(10) Patent No.: US 12,794,885 B2
(45) **Date of Patent: *Nov. 10, 2026**

(54) CLOSED-LOOP NETWORK PROVISIONING BASED ON NETWORK ACCESS CONTROL FINGERPRINTING

(71) Applicant: Juniper Networks, Inc., Sunnyvale, CA (US)

(72) Inventors: Madhava Rao Cheethirala, San Jose, CA (US); Raja Rao Tadimeti, San Jose, CA (US); Natarajan Manthiramoorthy, Fremont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 113 days.

This patent is subject to a terminal disclaimer.

(21) Appl. No.: 18/927,424

(22) Filed: Oct. 25, 2024

(65) Prior Publication Data

US 2025/0047675 A1 Feb. 6, 2025

Related U.S. Application Data

(63) Continuation of application No. 17/809,730, filed on Jun. 29, 2022, now Pat. No. 12,166,758.

(Continued)

(51) Int. Cl.
*H04L 9/40* (2022.01)

(52) U.S. Cl.
CPC ........ *H04L 63/0876* (2013.01); *H04L 63/101* (2013.01)

(58) Field of Classification Search
CPC .... H04L 63/0876; H04L 63/101; H04L 63/20
See application file for complete search history.

(56) References Cited

U.S. PATENT DOCUMENTS 8,190,755 B1 * 5/2012 Satish ................. H04L 61/5014 709/225
8,363,658 B1 * 1/2013 Delker .................. H04W 12/06 370/252

(Continued)

FOREIGN PATENT DOCUMENTS

CN 109768872 A 5/2019

OTHER PUBLICATIONS

Extended Search Report from counterpart European Application No. 22214796.9 dated Jul. 20, 2023, 9 pp.

(Continued)

*Primary Examiner* — Mohammed Waliullah
(74) *Attorney, Agent, or Firm* — Shumaker & Sieffert P.A.

(57) ABSTRACT

Techniques are described for providing network provisioning by a network management system (NMS) based on fingerprint information determined by a network access control (NAC) system. An example method includes receiving, by the NAC system, a network access request for a client device to access an enterprise network; obtaining, by the NAC system, fingerprint information of the client device associated with the network access request, wherein the fingerprinting information comprises information specifying one or more attributes associated with the client device; authenticating, by the NAC system, the client device to access the enterprise network; sending, by the NAC system and to the NMS, the fingerprint information of the client device; and provisioning, by the NMS, one or more network resources associated with the client device based on the fingerprint information of the client device.

20 Claims, 7 Drawing Sheets

Related U.S. Application Data

(60) Provisional application No. 63/319,644, filed on Mar. 14, 2022.

(56) References Cited

U.S. PATENT DOCUMENTS

| | | | | |
|---|---|---|---|---|
| 9,749,311 | B2 * | 8/2017 | Jayanti Venkata | G06F 8/60 |
| 9,832,082 | B2 | 11/2017 | Dade et al. | |
| 9,913,139 | B2 * | 3/2018 | Gross | H04W 8/18 |
| 10,756,983 | B2 | 8/2020 | Ratkovic et al. | |
| 10,862,742 | B2 | 12/2020 | Singh | |
| 10,958,537 | B2 | 3/2021 | Safavi | |
| 10,958,585 | B2 | 3/2021 | Safavi | |
| 10,985,969 | B2 | 4/2021 | Safavi | |
| 10,992,543 | B1 | 4/2021 | Rachamadugu et al. | |
| 11,271,923 | B2 * | 3/2022 | Kishimoto | H04L 63/0823 |
| 2008/0172366 | A1 * | 7/2008 | Hannel | H04L 63/20 |
| 2014/0223514 | A1 * | 8/2014 | Islam | H04L 63/1433 726/4 |
| 2015/0150110 | A1 * | 5/2015 | Canning | H04L 63/0807 726/9 |
| 2015/0296555 | A1 * | 10/2015 | Steer | H04W 76/14 370/329 |
| 2017/0325272 | A1 * | 11/2017 | Steer | H04W 12/06 |
| 2018/0176210 | A1 * | 6/2018 | Comay | H04W 12/069 |
| 2018/0367518 | A1 * | 12/2018 | Singh | H04L 63/06 |
| 2021/0058530 | A1 * | 2/2021 | Ohki | H04L 67/1044 |
| 2021/0306201 | A1 | 9/2021 | Wang et al. | |
| 2021/0326644 | A1 * | 10/2021 | Suski | G06F 21/44 |
| 2023/0247021 | A1 * | 8/2023 | Wang | H04L 63/0861 726/7 |
| 2023/0291735 | A1 | 9/2023 | Cheethirala et al. | |
| 2023/0403305 | A1 * | 12/2023 | Dementyev | H04L 63/0892 |

OTHER PUBLICATIONS

Prosecution History from U.S. Appl. No. 17/809,730, dated Aug. 23, 2023 through Oct. 28, 2024, 48 pp.

Radhakrishnan et al., "GTID: A Technique for Physical Device and Device Type Fingerprinting", IEEE Transactions on Dependable and Secure Computing, vol. 12, No. 5, IEEE, Nov. 10, 2014, pp. 519-532.

Response to Extended Search Report dated Jul. 20, 2023, from counterpart European Application No. 22214796.9 filed Mar. 14, 2024.

* cited by examiner

CLOSED-LOOP NETWORK PROVISIONING BASED ON NETWORK ACCESS CONTROL FINGERPRINTING

This application is a continuation of U.S. patent application Ser. No. 17/809,730, filed 29 Jun. 2022 which claims the benefit of U.S. Provisional Patent Application No. 63/319,644, filed 14-3-2022, the entire contents of which is incorporated herein by reference.

TECHNICAL FIELD

The disclosure relates generally to computer networks and, more specifically, to managing access to computer networks.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies.

Many different types of wireless client devices, such as laptop computers, smartphones, tablets, wearable devices, appliances, and Internet of Things (IoT) devices, incorporate wireless communication technology and can be configured to connect to wireless APs when the device is in range of a compatible AP. In order to gain access to a wireless network, a wireless client device may first need to authenticate to the AP. Authentication may occur via a handshake exchange between the wireless client device, the AP, and an Authentication, Authorization, and Accounting (AAA) server controlling access at the AP.

SUMMARY

In general, this disclosure describes one or more techniques for providing closed-loop network provisioning by a network management system (NMS) based on fingerprint information determined by a network access control (NAC) system. The NAC system is configured to authenticate client devices to access networks, such as branch or campus enterprise networks. The NAC system identifies the client devices by analyzing network behavior of the client devices, referred to as fingerprinting. Fingerprint information for a given client device includes one or more attributes associated with the client device, such as attributes associated with the client device itself, attributes associated with a user of the client device, and/or attributes associated with network connectivity of the client device.

As disclosed herein, the NAC system sends the fingerprint information of the client device to the NMS, or another centralized provisioning engine, configured to manage a plurality of network resources associated with the enterprise network. The NMS provisions one or more network resources, e.g., firewalls, switches, routers, access points, or servers, associated with the client device based on the fingerprint information of the client device received from the NAC system. In some examples, provisioning a network resource includes managing mappings of client device identifiers to client device attributes and one or more network resource policies and/or feature configurations corresponding to the attributes of the client devices.

The techniques of this disclosure provide one or more technical advantages and practical applications. For example, an NMS or centralized provisioning engine enables automated provisioning of network resources with improved granularity based on fingerprint information of client devices provided by NAC systems. The NMS may use the fingerprint information of client devices received from the NAC systems to enable administrators to define fine-grained correspondence of network resource policies and/or feature configurations to client device attributes. The NMS may then automatically provision the appropriate network resources associated with the client devices to include a mapping of client device identifiers to the client device attributes and corresponding network resource policies and/or features configurations. In this way, the NMS may provide centralized management of the correspondence between client device attributes and network resource policies and/or feature configurations across multiple network resources. In addition, the interaction between the NAC systems and the NMS may enable fine-grained filtering and policy application by network resources that traditionally do not have access to the fingerprint information of client devices, e.g., firewalls.

In one example, the disclosure is directed to an NMS configured to manage a plurality of network resources associated with an enterprise network, and a NAC system in communication with the NMS. The NAC system is configured to receive a network access request for a client device to access an enterprise network; obtain fingerprint information of the client device associated with the network access request, wherein the fingerprint information comprises information specifying one or more attributes associated with the client device; authenticate the client device to access the enterprise network; and send, to the NMS, the fingerprint information of the client device. The NMS is configured to provision one or more network resources associated with the client device based on the fingerprint information of the client device.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
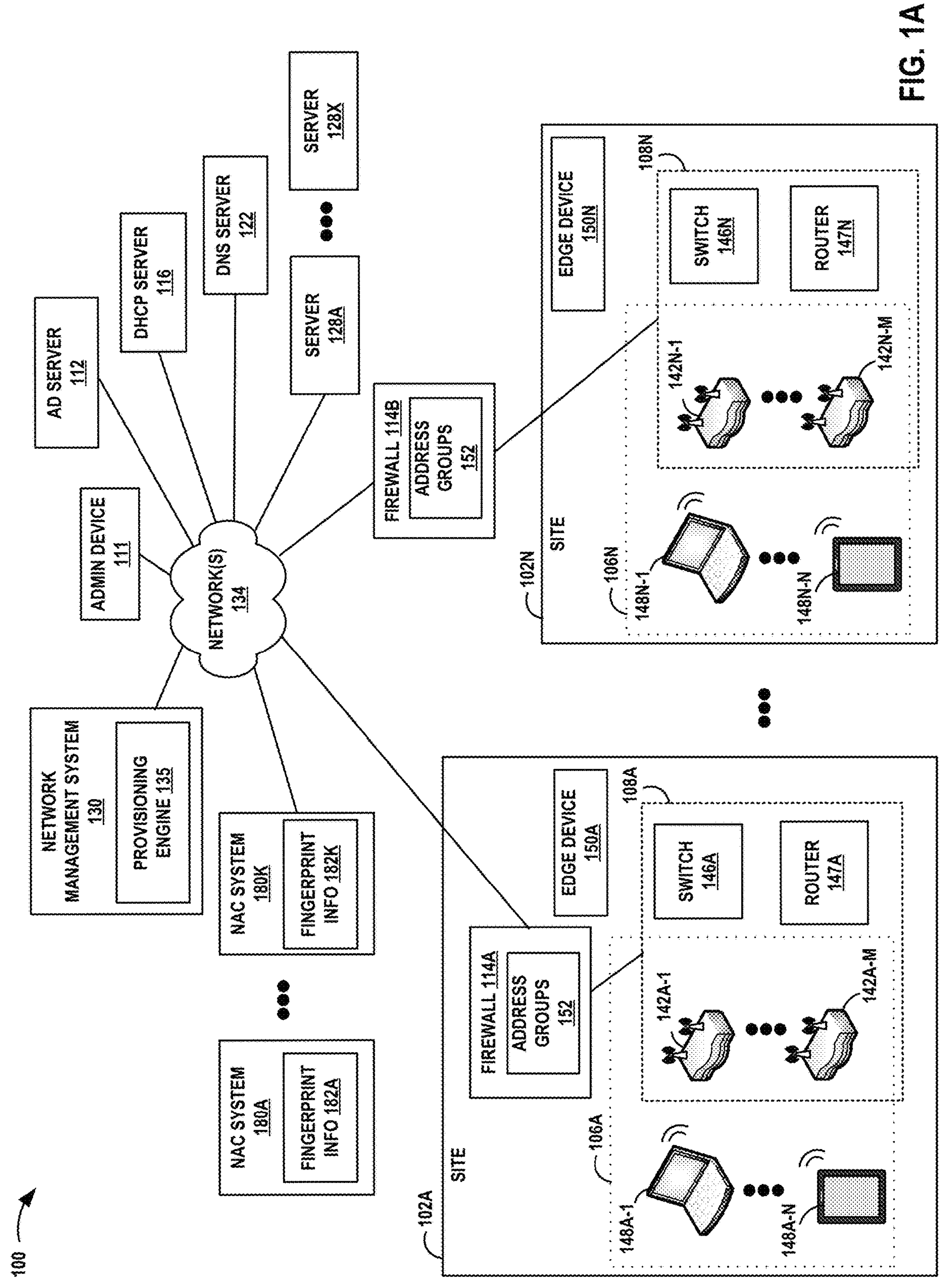
FIG. 1A is a block diagram of an example network system including a network management system and network access control systems, in accordance with one or more techniques of the disclosure.

FIG. 1A is a block diagram of an example network system 100 including network access control (NAC) systems 180A-180K and network management system (NMS) 130, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices 108A-108N, such as access points (APs) 142, switches 146, and routers 147. NAS devices may include any network infrastructure devices capable of authenticating and authorizing client devices to access an enterprise network. For example, site 102A includes a plurality of APs 142A-1 through 142A-M, a switch 146A, and a router 147A. Similarly, site 102N includes a plurality of APs 142N-1 through 142N-M, a switch 146N, and a router 147N. Each AP 142 may be any type of wireless access point, including, but not limited to, a commercial or enterprise AP, a router, or any other device that is connected to a wired network and is capable of providing wireless network access to client devices within the site. In some examples, each of APs 142A-1 through 142A-M at site 102A may be connected to one or both of switch 146A and router 147A. Similarly, each of APs 142N-1 through 142N-M at site 102N may be connected to one or both of switch 146N and router 147N.

In the example of FIG. 1A, site 102A also includes an on-premises firewall 114A, which may be a firewall service running on a router, such as router 147A, configured to apply security policies to data traffic from client devices at site 102A to devices or systems within the enterprise network. The illustrated example of FIG. 1A also includes a cloud-based firewall 114B connected to NAS devices 108N at site 102N. Cloud-based firewall 114B may be a firewall service running on a physical or virtual router configured to apply security policies to data traffic from client devices at site 102N to devices or systems within the enterprise network.

Each site 102A-102N also includes a plurality of client devices, otherwise known as user equipment devices (UEs), referred to generally as UEs or client devices 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106.

In order to provide wireless network services to UEs 148 and/or communicate over the wireless networks 106, APs 142 and the other wired client-side devices at sites 102 are connected, either directly or indirectly, to one or more network devices (e.g., switches, routers, gateways, or the like) via physical cables, e.g., Ethernet cables. Although illustrated in FIG. 1A as if each site 102 includes a single switch and a single router, in other examples, each site 102 may include more or fewer switches and/or routers. In addition, two or more switches at a site may be connected to each other and/or connected to two or more routers, e.g., via a mesh or partial mesh topology in a hub-and-spoke architecture. In some examples, interconnected switches 146 and routers 147 comprise wired local area networks (LANs) at sites 102 hosting wireless networks 106.

Example network system 100 also includes various networking components for providing networking services within the wired network including, as examples, NAC systems 180 including or providing access to Authentication, Authorization and Accounting (AAA) servers for authenticating users and/or UEs 148, an active directory (AD) server 112 for managing permissions and access to network resources, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and NMS 130. As shown in FIG. 1A, the various devices and systems of network 100 are coupled together via one or more network(s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. In some examples, NMS 130 operates in response to configuration input received from the administrator interacting with and/or operating admin device 111.

The administrator and admin device 111 may comprise IT personnel and an administrator computing device associated with one or more of sites 102. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of NAS devices 108, e.g., APs 142, switches 146, and routers 147, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices 108 while using NMS 130 and its distributed software architecture for scalable and resilient operations, management, troubleshooting, and analytics.

Each one of the network devices of network system 100, e.g., NAC systems 180, servers 112, 116, 122 and/or 128, firewalls 114, APs 142, switches 146, routers 147, UEs 148, edge devices 150, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 112, 116, 122 and/or 128, firewalls 114, APs 142, switches 146, routers 147, and UEs 148, may be considered "third-party" network devices when owned by and/or associated with a different entity than NMS 130 such that NMS 130 does not directly receive, collect, or otherwise have access to the recorded status and other data of the third-party network devices. In some examples, edge devices 150 may provide a proxy through which the recorded status and other data of the third-party network devices may be reported to NMS 130.

In the example of FIG. 1A, each of NAC systems 180 comprises a cloud-based network access control service at multiple, geographically distributed points of presence. Typically, network access control functionality is offered by on-premises appliances that are limited by processing power and memory as well as maintenance and upgrade issues. Offering cloud-based network access control services avoids the limitations and improves network administration. A centralized, cloud-based deployment of network access control, however, introduces issues with latency and failures that may block client devices from network access.

In accordance with the disclosed techniques, NAC systems 180 provide multiple points of presence or NAC clouds at several geographic regions. NMS 130 is configured to manage NAC configuration, including access policies for enterprise networks, and push the appropriate NAC configuration data or files to the respective NAC systems 180A-180K. In this way, NAC systems 180 provide the same benefits as a centralized, cloud-based network access control service with lower latency and high availability.

NAC systems 180 provide a way of authenticating client devices 148 to access wireless networks 106 of branch or campus enterprise networks. NAC systems 180 may each include or provide access to an Authentication, Authorization, and Accounting (AAA) server, e.g., a RADIUS server, to authenticate client devices 148 prior to providing access to the enterprise network via the NAS devices 108. In some examples, NAC systems 180 may enable certificate-based authentication of client devices or enable interaction with user directory services, e.g., an active directory at AD server 112, to authenticate the client devices.

NAC systems 180 may identify client devices 148 and provide client devices 148 with the appropriate authorizations or access policies based on their identities, e.g., by assigning the client devices to certain virtual local area networks (VLANs), applying certain access control lists (ACLs), directing the client devices to certain registration portals, or the like. NAC systems 180 may identify client devices 148 by analyzing network behavior of the client devices, referred to as fingerprinting, and store the identifying information as fingerprint information 182A-182K. Fingerprint information 182 for a given client device includes one or more attributes associated with the client device, such as attributes associated with the client device itself, attributes associated with a user of the client device, and/or attributes associated with network connectivity of the client device. In some examples, fingerprinting client devices may be performed based on media access control (MAC) addresses, DHCP options used to request IP addresses, link layer discovery protocol (LLDP) packets, Hypertext Transfer Protocol (HTTP) user agent information, location information, DNS information, and/or device type and operating system information.

Client devices 148 may include multiple different categories of devices with respect to a given enterprise, such as trusted enterprise devices, bring-your-own-device (BYOD) devices, IoT devices, and guest devices. NAC system 180 may be configured to subject each of the different categories of devices to different types of tracking, different types of authorization, and different levels of access privileges. In some examples, after a client device gains access to the enterprise network, NAC systems 180 may monitor activities of the client device to identify security concerns and, in response, re-assign the client device to a quarantine VLAN or another less privileged VLAN to restrict access of the client device.

NMS 130 is configured to operate according to an artificial intelligence/machine-learning-based computing platform providing comprehensive automation, insight, and assurance (WiFi Assurance, Wired Assurance and WAN assurance) spanning from "client," e.g., client devices 148 connected to wireless networks 106 and wired local area networks (LANs) at sites 102 to "cloud," e.g., cloud-based application services that may be hosted by computing resources within data centers.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network 100 so as to provide self-driving capabilities.

In some examples, AI-driven NMS 130 also provides configuration management, monitoring, and automated oversight of software defined wide-area networks (SD-WANs), which operate as an intermediate network communicatively coupling wireless networks 106 and wired LANs at sites 102 to data centers and application services. In general, SD-WANs provide seamless, secure, traffic-engineered connectivity between "spoke" routers (e.g., routers 147) of the wired LANs hosting wireless networks 106 to "hub" routers further up the cloud stack toward the cloud-based application services. SD-WANs often operate and manage an overlay network on an underlying physical Wide-Area Network (WAN), which provides connectivity to geographically separate customer networks. In other words, SD-WANs extend Software-Defined Networking (SDN) capabilities to a WAN and allow network(s) to decouple underlying physical network infrastructure from virtualized network infrastructure and applications such that the networks may be configured and managed in a flexible and scalable manner.

In some examples, AI-driven NMS 130 may enable intent-based configuration and management of network system 100, including enabling construction, presentation, and execution of intent-driven workflows for configuring and managing devices associated with wireless networks 106, wired LAN networks, and/or SD-WANs. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

As described above, access policies may be applied by NAC systems 180 during or in response to network access requests received from client devices 148. Other types of policies, e.g., security policies, routing policies, quality of service (QOS) policies, or other configuration information, may be applied to network traffic by certain network devices, e.g., on-premises firewalls 114A, cloud-based firewalls 114B, switches 146, routers 147, access points 142, or servers 128, within network system 100. For example, APs 146 and/or firewalls 114 may apply security policies to admit or block data traffic along data paths from client devices 148 to devices or systems within the enterprise network. An AP, e.g., AP 142A-1, may be configured to apply security policies at a transport layer (i.e., L4 of the Open Systems Interconnection (OSI) model) of the interconnections between client devices 148A and the devices or systems within the enterprise network, but AP 142-1 may not have the ability to apply policies at higher layers, e.g., an application layer (L7 of the OSI model), of the interconnections. However, a firewall, e.g., on-premises firewall 114A, in the data paths of client devices 148A to the devices or systems within the enterprise network may be configured to apply security policies at the application layer of the interconnections based on the actual content of messages in the exchanged data traffic.

Typically, firewalls 114, and other network devices, apply policies to data traffic based on a source IP address or a hostname associated with the client device from which the data traffic is sent. Such network devices typically do not have access to or knowledge of more fine-grained client device attributes determined during authentication and/or authorization of the client devices, such as those client attributes included in fingerprint information 182 determined by NAC systems 180. This is because, traditionally, firewalls and other network devices associated with data plane communications have no connection to network access control or endpoint fingerprinting systems operating in the control plane.

Conventionally, network provisioning, network access control, and endpoint fingerprinting systems operate independently and are not well integrated. Even though most of the information to make network provisioning decisions is available in NAC and/or fingerprinting engines, that information available in NAC and/or fingerprinting engines has not been accessible or utilized by provisioning systems. Instead, that information has mostly been manually conveyed to the provisioning system, which increases the likelihood of incomplete/error scenarios being entered as well as the additional time and expense of necessary manual intervention and resulting delays to correct the incomplete/error scenarios. In some examples, network devices may enforce a limited network policy in the form of AAA (e.g., RADIUS) attributes dispensed by network access control services during the authentication and/or authorization of client devices. However, this technique is cumbersome and difficult to manage. Further, geographically dispersed enterprise sites may add to the problem, resulting in separate configuration domains and hence inconsistent policies across the same types of network devices, e.g., firewalls, of the same enterprise network.

In accordance with the techniques of this disclosure, NMS 130 includes a provisioning engine 135 to provide closed-loop network provisioning of one or more network devices (e.g., firewalls 114, APs 142, switches 146, routers 147) at one or more of sites 102A-102N based on fingerprint information 182 determined by one or more NAC systems 180. As discussed above, NAC systems 180 may identify client devices 148 by analyzing network behavior of the client devices, referred to as fingerprinting, and store the identifying information as fingerprint information 182. NAC systems 180 send fingerprint information 182 of client devices 148 to NMS 130, or another centralized provisioning engine, configured to manage network resources at the enterprise sites 102. Provisioning engine 134 of NMS 130 provisions one or more of the network resources, e.g., firewalls 114, switches 146, routers 147, access points 148, or servers 128, associated with client devices 148 based on the fingerprint information 182 of client devices 148 received from NAC systems 180. In some examples, to provision a network resource, provisioning engine 134 of NMS 130 manages mappings of client device identifiers (e.g., IP addresses or hostnames) to client device attributes and one or more network resource policies and/or feature configurations corresponding to the attributes of the client devices.

The techniques of this disclosure provide one or more technical advantages and practical applications. For example, provisioning engine 134 of NMS 130 enables automated provisioning of network resources, e.g., firewalls 114, switches 146, routers 147, access points 148, or servers 128, with improved granularity based on fingerprint information 182 of client devices 148 provided by NAC systems 180. NMS 130 may use the fingerprint information 182 of client devices 148 received from NAC systems 180 to enable administrators, e.g., using admin device 111, to define fine-grained correspondence of network resource policies and/or feature configurations to client device attributes. Provisioning engine 135 of NMS 130 may then automatically provision the appropriate network resources associated with client devices 148 to include a mapping of client device identifiers to the client device attributes and corresponding network resource policies and/or features configurations.

According to the disclosed techniques, NMS 130 may provide centralized management of the correspondence between client device attributes and network resource policies and/or feature configurations across multiple network resources. In the illustrated example of FIG. 1A, on-premises firewall 114A may be in a data path of a particular client device, e.g., client device 148A-1, when client device 148A-1 is at the physical location of site 102A. In addition, cloud-based firewall 114B may be in a data path of the same client device 148A-1 when client devices 148A-1 is at the physical location of site 102B. The disclosed techniques enable NMS 130 to determine an address group attribute associated with client device 148A-1 based on fingerprint information of client device 148A-1 received from one of NAC systems 180 during authentication of client device 148A-1. Provisioning engine 135 of NMS 130 may then provision on-premises firewall 114A with an address group of address groups 152 that includes an IP address of client device 148A-1 and a security policy corresponding to the address group. Provisioning engine 135 of NMS 130 may also provision cloud-based firewall 114B with the same address group of address groups 152 that includes the IP address of client device 148A-1 and the same security policy corresponding to the address group.

In addition, the interaction between NAC systems 180 and NMS 130 may enable fine-grained filtering and policy application by network resources that traditionally do not have access to the fingerprint information of client devices, e.g., firewalls 114. In the illustrated example of FIG. 1A, provisioning engine 135 of NMS 130 may provision each of firewalls 114A, 114B with address groups 152 and corresponding security policies. Address groups 152 may include a mapping of an identifier of each of one or more client devices 148 to one or more attributes associated with the respective client device and corresponding security policies. In this way, firewalls 114A, 114B are provisioned to apply security policies to incoming data traffic from client devices 148 based on more fine-grained user attributes than IP address or subnet alone. For example, upon receipt of data traffic from client device 148A-1, firewall 114A may perform a lookup of the IP address of client device 148A-1 in address groups 152 to determine which address group includes the client 148A-1. The identified address group to which client 148A-1 belongs may represent a group of client devices having an 802.1x connection to the enterprise network and having an assigned role as employee. In that example, firewall 114A may apply a corresponding security policy to the data traffic from client 148A-1 to allow the data traffic.

Although the techniques of the present disclosure are described in this example as performed by NAC systems 180 and/or NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NAC systems 180 or NMS 130, or may be distributed throughout network 100, and may or may not form a part of NAS systems 180 or NMS 130.

Figure 1B:
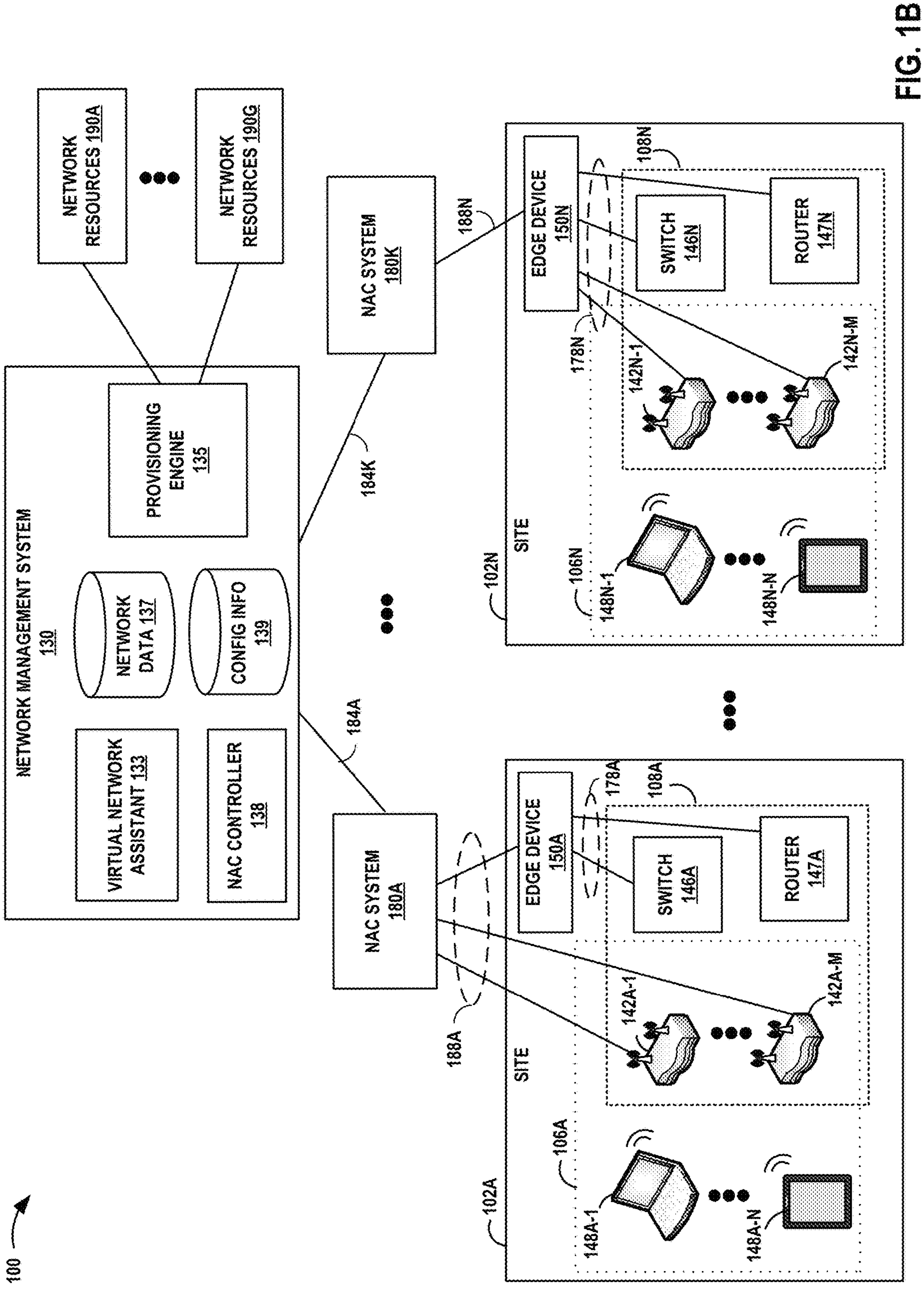
FIG. 1B is a block diagram illustrating further example details of the network system of FIG. 1A.

FIG. 1B is a block diagram illustrating further example details of the network system of FIG. 1A. In this example, FIG. 1B illustrates logical connections 178A-178N, 188A-188N, and 184A-184K, between NAS devices 108 at sites 102, NAC systems 180, and NMS 130. In addition, FIG. 1B illustrates NMS 130 configured to operate according to an AI-based computing platform to provide configuration and management of one or more of NAC systems 180 and NAS devices 108 at sites 102 via the logical connections.

In operation, NMS 130 observes, collects and/or receives network data 137, which may take the form of data extracted from messages, counters, and statistics, for example, from one or more of APs 142, switches 146, routers 147, edge devices 150, NAC systems 180, network resources 190A-190G, and/or other nodes within network 134. Although illustrated in FIG. 1B as being external to sites 102, network resources 190 may comprise one or more of on-premises firewalls, cloud-based firewalls, switches, routers, access points, or servers that are within or associated with enterprise sites 102.

NMS 130 provides a management plane for network 100, including management of enterprise-specific configuration information 139 for one or more of NAS devices 108 at sites 102 and NAC systems 180. Each of the one or more NAS devices 108, network resources 190, and NAC systems 180 may have a secure connection with NMS 130, e.g., a RadSec (RADIUS over Transport Layer Security (TLS)) tunnel or another encrypted tunnel. Each of the NAS devices 108, network resources 190, and NAC systems 180 may download the appropriate enterprise-specific configuration information 139 from NMS 130 and enforce the configuration. In some scenarios, one or more of the NAS devices 108 or network resources 190 may be a third-party device or otherwise not support establishment of a secure connection directly with NMS 130. In these scenarios, edge devices 150 may provide proxies through which the NAS devices 108 and/or network resources 190 may connect to NMS 130.

In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing virtual network assistant (VNA) 133, NAC controller 138, and/or provisioning engine 135 may be part of the NMS 130, may execute on other servers or execution environments, or may be distributed to nodes within network 134 (e.g., routers, switches, controllers, gateways, and the like).

In some examples, NMS 130 monitors network data 137, e.g., one or more service level expectation (SLE) metrics, received from each site 102A-102N, and manages network resources 190, such as the one or more of APs 142, switches 146, routers 147, and edge devices 150 at each site, to deliver a high-quality wireless experience to end users, IoT devices and clients at the site. In other examples, NMS 130 monitors network data 137 received from NAC systems 180 and manages enterprise-specific configuration information 139 for NAC systems 180 to enable unconstrained network access control services for client devices 148 at sites 102 with low latency and high availability.

As illustrated in FIG. 1B, NMS 130 includes VNA 133 that implements an event processing platform for providing real-time insights and simplified troubleshooting for IT operations, and that automatically takes corrective action or provides recommendations to proactively address network issues. VNA 133 may, for example, include an event processing platform configured to process hundreds or thousands of concurrent streams of network data 137 from sensors and/or agents associated with APs 142, switches 146, routers 147, edge devices 150, NAC systems 180, network resources 190, and/or other nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In addition, as illustrated in FIG. 1B, NMS 130 may include a NAC controller 138 that implements a NAC configuration platform that provides a user interface to create and assign access policies for client devices 148 of enterprise wireless networks 106, and provides the appropriate enterprise-specific configuration information 139 to the respective NAC clouds 180A-180K. NMS 130 may have a secure connection 184A-184K, e.g., a RadSec tunnel or another encrypted tunnel, with each of NAC systems 180A-180K, respectively. Through secure connections 184, NAC controller 136 may receive network data 137, e.g., NAC event data, from each of NAC systems 180 and each of NAC systems 180 may download the appropriate configuration information 139 from NMS 130. In some examples, NAC controller 138 may log or map which enterprise networks are served by which of NAC systems 180. In addition, NAC controller 138 may monitor NAC systems 180 to identify failures of primary NAC systems and manage failovers to standby NAC systems.

NAC systems 180 provide network access control services in a control plane for one or more of NAS devices 108 at sites 102. In operation, NAC systems 180 authenticate client devices 148 to access enterprise wireless networks 106 and may perform fingerprinting to identify the client devices 148 and apply authorizations or access polices to the client devices 148 based on the identities. NAC systems 180 include multiple, geographically distributed points of presence. For example, NAC system 180A may comprise a first cloud-based system positioned within a first geographic region, e.g., U.S. East, NAC system 180B (not shown) may comprise a second cloud-based system positioned within a second geographic region, e.g., U.S. West, and NAC system 180K may comprise a $k^{th}$ cloud-based system positioned within a $k^{th}$ geographic region, e.g., China.

Deploying multiple NAC clouds at several geographic regions enables network access control services to be offered to nearby NAS devices with lower latency and high availability, while avoiding the processing limitations and maintenance issues experienced by on-premises NAC appliances. For example, NAS devices 108A within enterprise network site 102A may connect to the physically closest one of NAC systems, i.e., NAC system 180A, to experience lower latency for network access control services. In some examples, the physically closest one of NAC systems 180 may comprise a primary NAC system, and the NAS devices may also connect to a next closest one of NAC systems 180 as a standby NAC system in case of a failure of the primary NAC system. For example, NAS devices 108A within enterprise network site 102A may connect to both NAC system 180A and NAC system 108B (not shown), to experience high availability of network access control services.

In the example illustrated in FIG. 1B, each of NAS devices 108, directly or indirectly, has a secure connection with at least one of NAC systems 180 or NMS 130. For example, each of APs 142A within site 120A has a direct, secure connection 188A to NAC system 180A, e.g., a RadSec tunnel or another encrypted tunnel. Each of switch 146A and router 147A within site 120A has an indirect connection to NAC system 180A via edge device 150A. In this example, switch 146A and router 147A may not support establishment of a secure connection directly with NAC system 180A, but edge device 150A may provide a proxy through which switch 146A and router 147A may connect to NAC system 180A. For example, each of switch 146A and router 147A have a direct connection 178A, e.g., a RADIUS tunnel, to edge device 150A, and edge device 150A has a direct, secure connection 188A to NAC system 180A. Similarly, for site 102N, each of NAS devices 108N has an indirect connection to NAC system 180K via edge device 150N. In this example, APs 142N, switch 142N, and router 147N may not support establishment of a secure connection directly with NAC system 180K, but edge device 150N may provide a proxy through which NAS devices 108N may connect to NAC system 180K. For example, each of APs 142N, switch 146N, and router 147N have a direct connection 178N, e.g., a RADIUS tunnel, to edge device 150N, and edge device 150N has a direct, secure connection 188N to NAC system 180K.

Through secure connections 188, NAC systems 180 may receive network access requests from client devices 148 through NAS devices 108 (and in some cases edge devices 150) at nearby enterprise sites 102. In response to the network access requests, NAC systems 180 authenticate the requesting client devices using an AAA server. NAC system 180 may perform fingerprinting to identify the authenticated client devices. NAC systems 180 then enforce the appropriate access policies on the identities of the authenticated client devices per the enterprise-specific configuration information 139 downloaded from NMS 130. In accordance with one specific implementation, a computing device is part of each of NAC systems 180. In accordance with other implementations, each of NAC systems 180A-180K may comprise one or more computing devices, dedicated servers, virtual machines, containers, services, or other forms of environments for performing the techniques described herein.

In accordance with one or more techniques of this disclosure, NMS includes provisioning engine 135 that provides closed-loop network provisioning of one or more network resources 190 based on fingerprint information 182 determined by one or more NAC systems 180. For example, through secure connections 184, NMS 130 receives the fingerprint information 182 from NAC systems 180, and provisioning engine 135 may provision the one or more network resources 190 via secure connections or via an application programming interface (API) or command line interface (CLI) of the respective network resource.

As one example, to obtain the fingerprint information of a client device, e.g., client device 148A-1, NAC system 180A performs a lookup of an identifier of client device 148A-1 in a user directory associated with the enterprise network, e.g., an active directory at AD server 112, and determines, based on the lookup, the one or more attributes associated with client device 148A-1. The fingerprint information of client device 148A-1 comprises a mapping of the identifier (e.g., an IP address or a hostname) of the client device to the one or more attributes associated with the client device. NAC system 180A may authenticate client device 148A-1 to access the enterprise wireless network 106A based, at least in part, on the fingerprint information 182 of client device 148A-1.

Provisioning engine 135 of NMS 130 provisions one or more of network resources 190 associated with client device 148A-1 based on the fingerprint information of client device 148A-1 received from NAC system 180A. For example, NMS 130 determines certain attributes associated with client device 148A-1 based on the fingerprint information of client device 148A-1 and identifies network resource policies and/or feature configurations corresponding to the certain attributes. Provisioning engine 135 maintains resource information that includes a mapping of the identifier of client device 148A-1 to the certain attributes of client device 148A-1 and network resource policies and/or feature configurations corresponding to the certain attributes. For example, NMS 130 may identify a user group attribute associated with client device 148A-1 as specified in the fingerprint information of client device 148A-1, and then include the identifier of client device 148A-1 in the identified user group. Provisioning engine 135 may then provision one or more network resources 190 by updating an existing user group to include the identifier of client device 148A-1 or adding a new user group that includes the identifier of client device 148A-1 to the network resources. Provisioning engine 135 may also periodically update the resource information at the one or more of network resources 190 to remove identifiers of one or more client devices that are no longer using the one or more of network resources 190.

An example use case of provisioning on-premises and cloud-based firewalls is described above with respect to FIG. 1A. Additional example use cases include, provisioning a session-based router that employs a stateful, session-based routing scheme to independently perform path selection and traffic engineering to establish data paths of the client devices according to routing policies; provisioning a router, a switch, or another network device configured to transmit data traffic of the client devices according to bandwidth or QoS policies; and provisioning a switch or other network device supporting an Ethernet Virtual Private Network (EVPN) across multiple sites of the enterprise network to exchange data traffic of the client device and/or supporting multicast traffic to provide data to the client devices.

Figure 2:
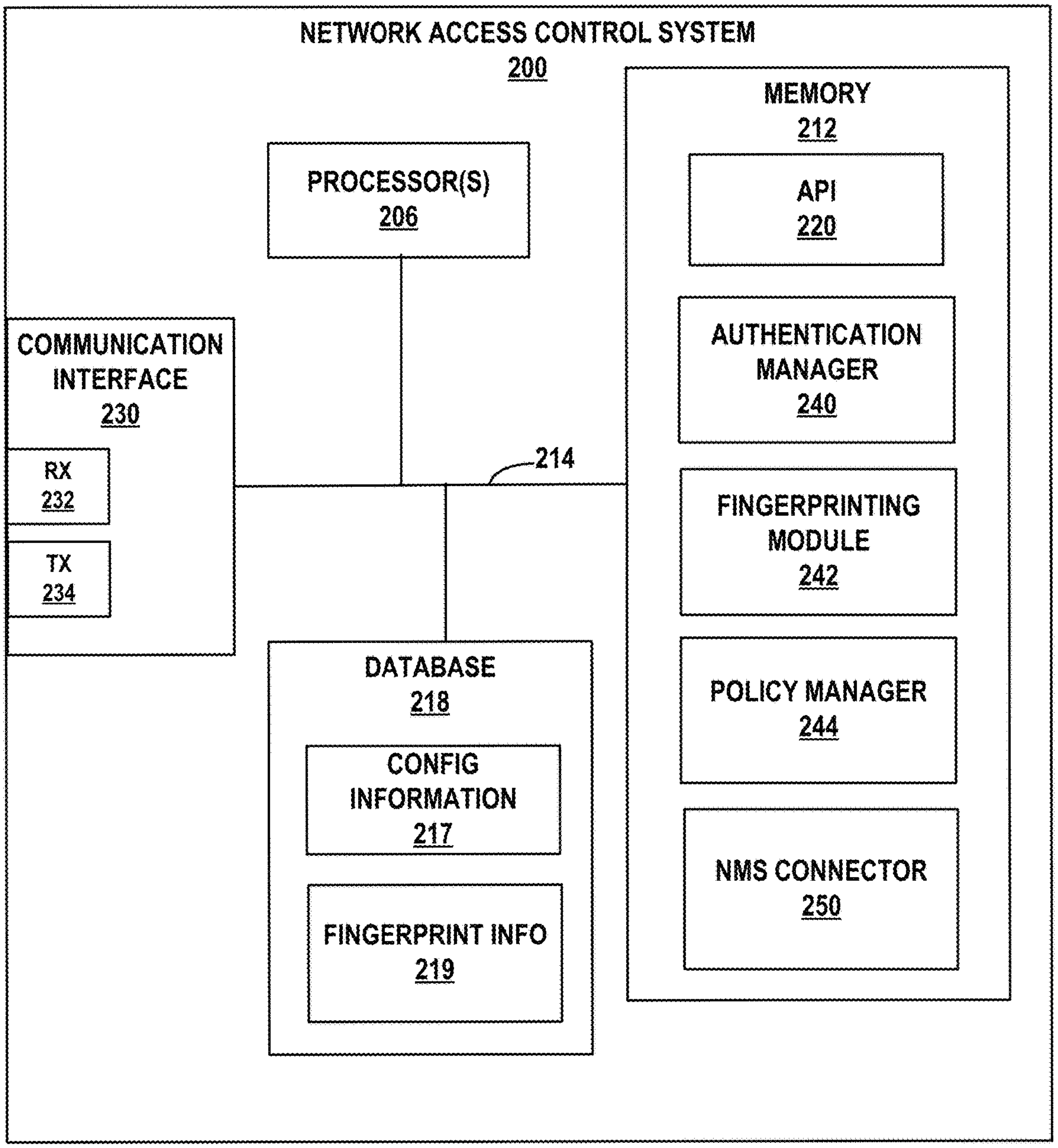
FIG. 2 is a block diagram of an example network access control system, in accordance with one or more techniques of this disclosure.

FIG. 2 is a block diagram of an example network access control (NAC) system 200, in accordance with one or more techniques of the disclosure. NAC system 200 may be used to implement, for example, any of NAC systems 180 in FIGS. 1A, 1B. In such examples, NAC system 200 is responsible for authenticating and authorizing one or more client devices 148 to access enterprise wireless networks 106 at a sub-set of nearby enterprise sites 102A-102N.

NAC system 200 includes a communications interface 230, one or more processor(s) 206, a memory 212, and a database 218. The various elements are coupled together via a bus 214 over which the various elements may exchange data and information. In some examples, NAC system 200 receives network access requests from one or more of client devices 148 through NAS devices 108 (and in some cases edge devices 150) at the sub-set of nearby enterprise sites 102 from FIGS. 1A, 1B. In response to the network access requests, NAC system 200 authenticates the requesting client devices. In some examples, NAC system 200 enforces appropriate access policies on the authenticated client devices in accordance with enterprise-specific configuration information 217 downloaded from NMS 130 from FIGS. 1A, 1B. In some examples, NAC system 200 may be part of another server shown in FIG. 1A, 1B or a part of any other server.

Processor(s) 206 execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Communications interface 230 may include, for example, an Ethernet interface. Communications interface 230 couples NAC system 200 to a network and/or the Internet, such as any of network 134 as shown in FIG. 1A and/or any local area networks. Communications interface 230 includes a receiver 232 and a transmitter 234 by which NAC system 200 receives/transmits data and information to/from any of APs 142, switches 146, routers 147, edge devices 150, NMS 130, or servers 116, 122, 128 and/or any other network nodes, devices, or systems forming part of network system 100 such as shown in FIGS. 1A, 1B.

The data and information received by NAC system 200 may include, for example, configuration information 217 associated with one or more of enterprise sites 102 that is downloaded from NMS 130. Configuration information 217 may include enterprise-specific NAC configuration information, including access policies and associated policy assignment criteria. For example, configuration information 217 may define certain virtual local area networks (VLANs), access control lists (ACLs), registration portals, or the like, associated with certain categories of client devices. Configuration information 217 may further define, for each of the different categories of the client devices, different types of tracking, different types of authorization, and/or different levels of access privileges. In addition, the data and information received by NAC system 200 may include identification information of client devices 148 from NAS devices 108 that is used by NAC system 200 to perform fingerprinting of the end user devices in order to enforce the access policies as defined in configuration information 217. NAC system 200 may further transmit data and information via communications interface 330 to NMS 130 including, for example, NAC event data, which may be used by NMS 130 to remotely monitor the performance of NAC system 200.

Memory 212 includes one or more devices configured to store programming modules and/or data associated with operation of NAC system 200. For example, memory 212 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 includes an application programing interface (API) 220, an authentication manager 240, a fingerprinting module 242, a policy manager 244, and an NMS connector 250. NAC system 200 may also include any other programmed modules, software engines and/or interfaces configured for authentication and authorization of client devices 148.

Authentication manager 240 enables authentication of client devices 148 at NAS devices 108 to access wireless networks 106 of branch or campus enterprise networks, at the sub-set of enterprise sites 102 in communication with NAC system 200. Authentication manager 240 may perform the functionality of an AAA server, e.g., a RADIUS server, or provide access to an AAA server to authenticate client devices 148 prior to providing access to the enterprise wireless networks 106 via the NAS devices 108. In some examples, authentication manager 240 may participate in a handshake exchange between a client device, an NAS device, and NAC system 200 controlling access at the NAS device. In other examples, authentication manager 240 may enable certificate-based authentication of client devices or enable interaction with user directory services, e.g., an active directory at AD server 112 of FIG. 1A, to authenticate the client devices.

Fingerprinting module 242 enables identification of client devices 148 used to provide the client devices with appropriate authorizations or access policies based on their identities or categorizations. Fingerprinting module 242 may identify client devices 148 by analyzing network behavior of the client devices and store the identifying information as fingerprint information 219 in database 218. Fingerprinting module 242 may perform fingerprinting of client devices 148 based on one or more of MAC addresses, DHCP options used to request IP addresses, LLDP packets, HTTP user agent information, location information, DNS information, and/or device type and operating system information.

Policy manager 244 enables enforcement of the authorizations or access policies based on the identities or categorizations of the authenticated client devices. For example, policy manager 244 may assign the authenticated client devices to certain VLANs, apply certain ACLs, direct the client devices to certain registration portals, or the like, that are each associated with different types of tracking, different types of authorization, and/or different levels of access privileges in accordance with configuration information 217 for the corresponding enterprise of the client devices. In some examples, after a client device gains access to the enterprise network, policy manger 244 may monitor activities of the client device to identify security concerns and, in response, re-assign the client device to a quarantine VLAN or another less privileged VLAN to restrict access of the client device.

NMS connector 250 manages the data and information exchanged between NAC system 200 and NMS 130, e.g., via a RadSec tunnel or another encrypted tunnel 184, as shown in FIG. 1B. NMS connector 250 may maintain a log or mapping of which enterprise networks are served by NAC system 200 and the corresponding configuration information 217 for those enterprises. NMS connector 250 may also manage any updates or modifications to configuration information 217 received from NMS 130.

In accordance with one or more techniques of this disclosure, authentication manager 240 initially receives a network access request for a client device to access an enterprise network. Fingerprinting module 242 then obtains fingerprint information 219 of the client device associated with the network access request. As described above, fingerprinting module 242 may "fingerprint" client devices 148 by analyzing network behavior of the client devices. Fingerprinting module 242 may receive the network behavior data of the client devices 148 from the NAS devices 108 and/or edge devices 150 in communication with NAS system 200. Fingerprint information 219 for a given client device includes one or more attributes associated with the client device, such as attributes associated with the client device itself, attributes associated with a user of the client device, and/or attributes associated with network connectivity of the client device. Fingerprint information 219 of the client device comprises a mapping of the identifier of the client device, e.g., an IP address or a hostname, to the one or more attributes associated with the client device.

In some examples, fingerprinting module 242 may perform a lookup of an identifier of a client device in a user directory, e.g., an active directory at AD server 112, and determine, based on the lookup, the one or more attributes associated with the client device. In this way, fingerprinting module 242 of NAC system 200 dynamically performs an AD lookup instead of performing log scrapping.

In other examples, fingerprinting module 242 may collect endpoint attributes associated with the requesting client device itself. In this example, the endpoint attributes associated with the requesting client device may include client device make, model, operating system (OS) version, wireless network name (SSID), MAC address, IP address, time-of-connection, communication pattern, or the like. Further, fingerprinting module 242 may collect user attributes associated with the user of the requesting client device. By way of example, the user attributes may include username, user groups, home-office-location, grade, department, manager, or the like. Furthermore, fingerprinting module 242 may obtain connection attributes associated with the connection of the requesting client device to the enterprise network. By way of example, fingerprint information 219 may include device details (MAC address, organizationally unique identifier (OUI), vendor, type-of-device), device connectivity details (switch/port, wireless AP), device networking details (IP address, DHCP options), device user details (username, user group), device OS, LLDP packets, device OS and package versions, and other behavioral details associated with the client device.

Authentication manager 240 authenticates the client device to access the enterprise network based at least on fingerprint information 219 of the client device. NMS connector 250 then sends the fingerprint information 219 of the client device to NMS 130.

Figure 3:
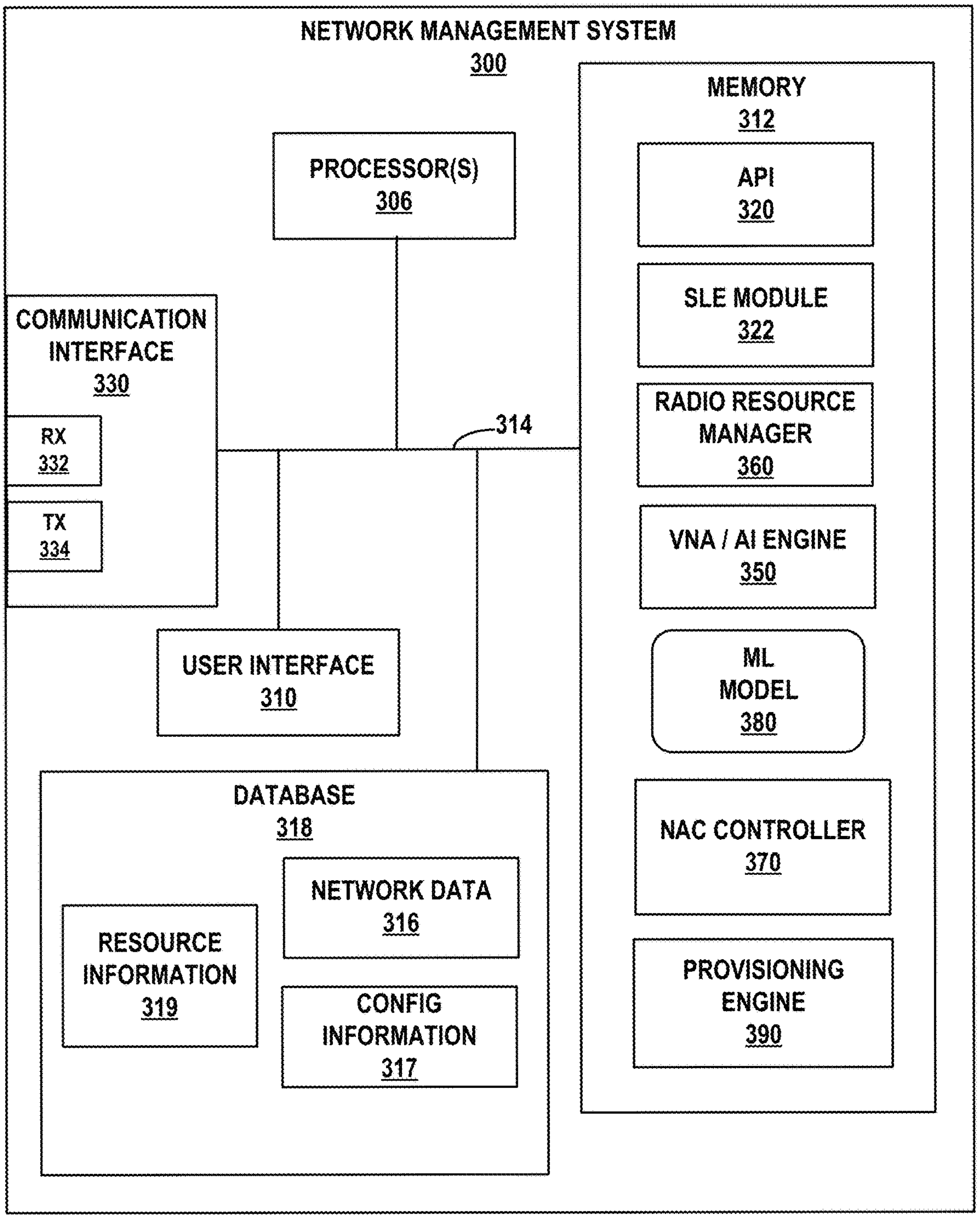
FIG. 3 is a block diagram of an example network management system, in accordance with one or more techniques of the disclosure.

FIG. 3 is a block diagram of an example network management system (NMS) 300, in accordance with one or more techniques of the disclosure. NMS 300 may be used to implement, for example, NMS 130 in FIGS. 1A, 1B. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of client devices 148, APs 142, switches 146, routers, 147, edge devices 150, NAC systems 180, and other network nodes within network 134, e.g., routers and gateway devices, which may be used to calculate one or more SLE metrics and/or update network data 316 in database 318. NMS 300 analyzes this data for cloud-based management of wireless networks 106A-106N. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of client devices 148, APs 142, switches 146, routers 147, edge devices 150, NAC systems 180, servers 116, 122, 128 and/or any other network nodes, devices, or systems forming part of network system 100 such as shown in FIG. 1A. In some scenarios described herein in which network system 100 includes "third-party" network devices that are owned and/or associated with different entities than NMS 300, NMS 300 does not directly receive, collect, or otherwise have access to network data from the third-party network devices. In some examples, an edge device, such as edge devices 150 from FIGS. 1A, 1B, may provide a proxy through which the network data of the third-party network devices may be reported to NMS 300.

The data and information received by NMS 300 may include, for example, telemetry data, SLE-related data, or event data received from one or more of client device 148, APs 142, switches 146, routers 147, edge devices 150, NAC systems 180, or other network nodes, e.g., routers and gateway devices, used by NMS 300 to remotely monitor the performance of wireless networks 106A-106N and application sessions from client device to cloud-based application server. NMS 300 may further transmit data via communications interface 330 to any of the network devices, such as client devices 148, APs 142, switches 146, routers 147, edge devices 150, NAC systems 180, or other network nodes within network 134, to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, a radio resource manager (RRM) 360, a NAC controller 370, and a provisioning engine 390. NMS 300 may also include any other programmed modules, software engines and/or interfaces configured for remote monitoring and management of wireless networks 106A-106N and portions of the wired network, including remote monitoring and management of any of APs 142, switches 146, routers 147, edge devices 150, NAC systems 180, network resources 190 or other network devices.

SLE module 322 enables set up and tracking of thresholds for SLE metrics for each network 106A-106N. SLE module 322 further analyzes SLE-related data collected by, e.g., APs, such as any of APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, is transmitted to NMS 300 and stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired to abnormal states are encountered at one of the network devices. For example, VNA/AI engine 350 may identify the root cause of any undesired or abnormal states, e.g., any poor SLE metric(s) indicative of connected issues at one or more network devices. In addition, VNA/AI engine 350 may automatically invoke one or more corrective actions intended to address the identified root cause(s) of one or more poor SLE metrics. In some examples, ML model 380 may comprise a supervised ML model that is trained, using training data comprising pre-collected, labeled network data received from the network devices. The supervised ML model may comprise one of a logistical regression, naïve Bayesian, support vector machine (SVM), or the like. In other examples, ML model 380 may comprise an unsupervised ML model. Although not shown in FIG. 3, in some examples, database 318 may store the training data and VNA/AI engine 350 or a dedicated training module may be configured to train ML model 380 based on the training data to determine appropriate weights across the one or more features of the training data.

Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

NAC controller 370 implements a NAC configuration platform that provides user interface 310 for display to an enterprise network administrator, e.g., via admin device 111 of FIG. 1A, through which to receive access policy information for the enterprise network. NAC controller 370 creates enterprise-specific configuration information 317 stored in database 318 based on the input received via user interface 310. Configuration information 317 may include NAC configuration information for one or more enterprise networks managed by NMS 300. For each enterprise, configuration information 317 may including access policies and associated policy assignment criteria. For example, configuration information 317 may define certain VLANs, ACLs, registration portals, or the like, associated with certain categories of client devices, and may further define, for each of the different categories of the client devices, different types of tracking, different types of authorization, and/or different levels of access privileges. Configuration information 317 may be substantially similar to configuration information 139 of FIG. 1B.

NAC controller 370 manages the data and information exchanged between NMS 300 and NAC systems 180, e.g., via RadSec tunnels or another encrypted tunnels 184, as shown in FIG. 1B. NAC controller 370 may maintain a log or mapping of which enterprise networks are served by which of NAC systems 180 and the corresponding configuration information 317 for those enterprises. NAC controller 370 may also manage any updates or modifications to configuration information 317 to be pushed down to NAC systems 180. In addition, NAC controller 370 may monitor NAC systems 180 to identify failures of primary NAC systems and manage failovers to standby NAC systems.

In accordance with one or more techniques of this disclosure, NAC controller 370 further manages fingerprint information of client devices 148 received from NAC systems 180. Provisioning engine 390 determines certain attributes associated with a particular client device based on the fingerprint information of the particular client device and identifies network resource policies and/or feature configurations corresponding to the certain attributes. Provisioning engine 390 stores a mapping of the identifier (e.g., IP address or hostname) of the particular client device to the certain attributes of the particular client device and the corresponding network resource policies and/or feature configurations as resource information 319 in database 318. For example, provisioning engine 390 may identify a user group attribute of the particular client device as specified in the fingerprint information of the client device. Provisioning engine 390 may then include the identifier (e.g., IP address or hostname) of the client device in the identified user group and store the mapping of the client device ID to policies corresponding to the identified user group as resource information 319 in database 318.

Provisioning engine 390 may generate a resource configuration platform that provides user interface 310 for display to the enterprise network administrator, e.g., via admin device 111 of FIG. 1A, through which to receive policy and/or feature configuration information for network resources of the enterprise network. For example, the policies and/or feature configurations may include one or more of access policies, security policies, routing policies, QoS policies, data link configurations, logical cluster memberships, or other configuration information policies. Provisioning engine 390 may use the fingerprint information of client devices 148 received from NAC systems 180 to enable administrators, e.g., using admin device 111, to define fine-grained correspondence of policies and/or feature configurations based on client device attributes via user interface 310.

Provisioning engine 390 then provisions one or more network resources 190 associated with the client device based on the fingerprint information of client devices 148. More specifically, provisioning engine 390 may provision the appropriate network resources 190 associated with the client devices 148 to include the mapping of client device identifiers to client device attributes and corresponding network resource policies and/or feature configurations based on resource information 319.

In one example, to provision a network resource, provisioning engine 390 updates an existing user group of the one or more user groups at the network resource to include identifiers of new client devices added to the existing user group based on resource information 319. In that example, at least one policy previously provisioned at the network resource corresponds to the existing user group. In another example, to provision a network resource, provisioning engine 390 provisions the network resource with a new user group that includes the identifiers of one or more client devices and at least one new policy corresponding to the new user group based on resource information 319. In some examples, provisioning engine 390 periodically updates the resource information at one of network resources 190 to remove identifiers of one or more client devices that are no longer using the network resource.

One example of provisioning a network resource based on fingerprint information includes provisioning security policies at a firewall related to the admission of a client device into the network by understanding the vendor/model/capabilities of the client device. In this example, DHCP sensors may be used to identify the IP address of the requesting client device to understand the network of the client device. The client device specific properties, e.g., serial number, may be retrieved by NAC systems 180 and sent to NMS 300. The disclosed techniques enable provisioning engine 390 to provision the firewall to provide an automated way of onboarding the client device into the network in a safe and secure manner based on the security policies.

Another example of provisioning a network resource based on fingerprint information includes determining a role of a network device. In this example, networks are architected using tiered design, where each device at a specific layer plays a "role" that involves corresponding network configuration. Furthermore, LLDP sensors may be used to discover the topological connectivity between devices to automatically determine the role of the network device. Provisioning engine 390 may then automatically provision the network device based on the role without user intervention. Example roles of the devices could be "access", "distribution", "access-point" and "firewall" etc.

Another example of provisioning a network resource based on fingerprint information includes determining inter-switch link (ISL) properties between various network devices. In this example, depending on the role of the network devices, uplink/downlink and peer links are identified automatically. Provisioning engine 390 may then automatically provision corresponding link properties and groupings.

In yet another example of provisioning a network resource based on fingerprint information, provisioning engine 390 may automatically form a logical cluster of devices and/or automatically create isolation domains based on device properties.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 4:
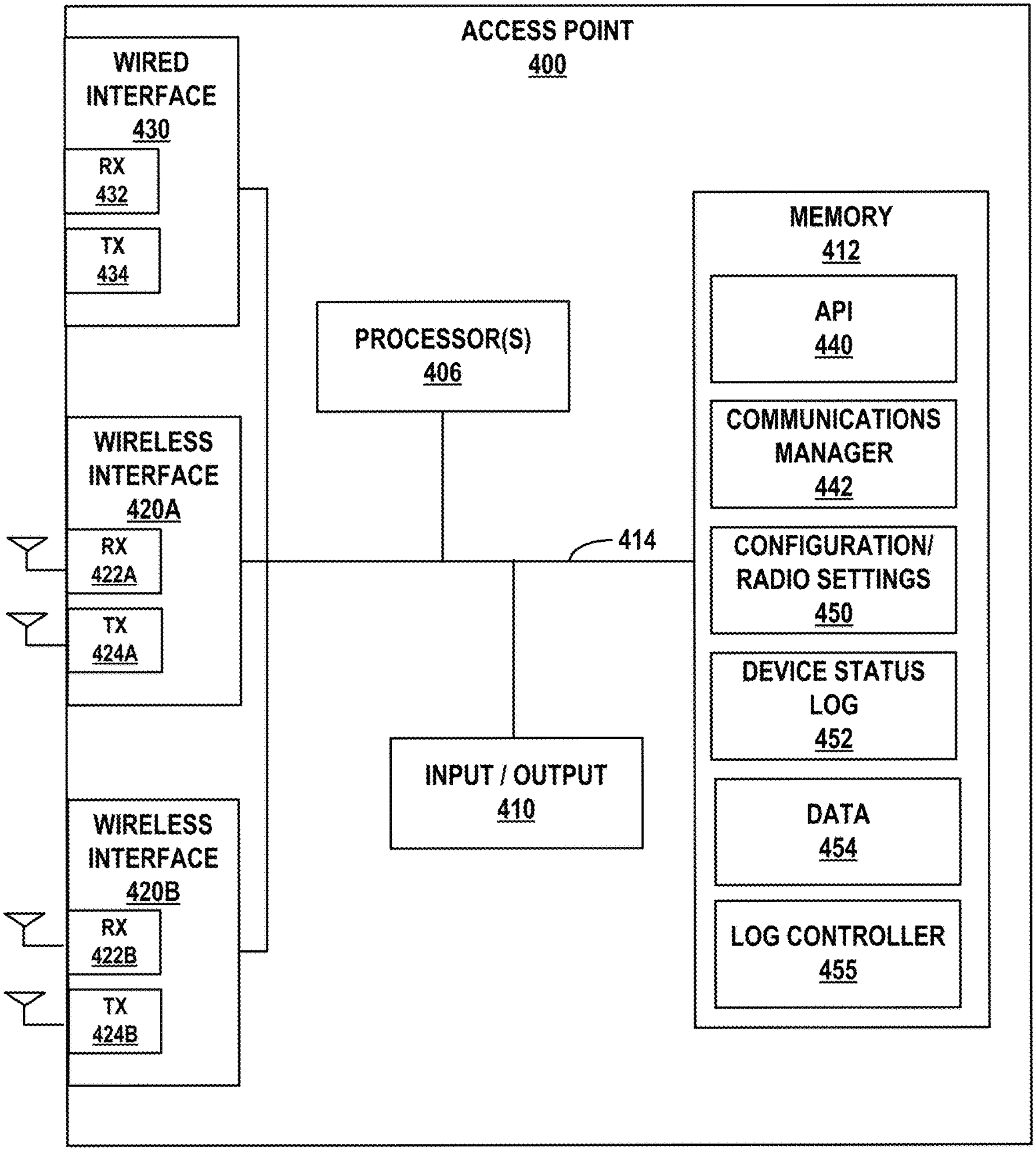
FIG. 4 is a block diagram of an example access point device, in accordance with one or more techniques of this disclosure.

FIG. 4 is a block diagram of an example access point (AP) device 400, in accordance with one or more techniques of this disclosure. Example access point 400 shown in FIG. 4 may be used to implement any of APs 142 as shown and described herein with respect to FIG. 1A. Access point 400 may comprise, for example, a Wi-Fi, Bluetooth and/or Bluetooth Low Energy (BLE) base station or any other type of wireless access point.

In the example of FIG. 4, access point 400 includes a wired interface 430, wireless interfaces 420A-420B one or more processor(s) 406, memory 412, and input/output 410, coupled together via a bus 414 over which the various elements may exchange data and information. Wired interface 430 represents a physical network interface and includes a receiver 432 and a transmitter 434 for sending and receiving network communications, e.g., packets. Wired interface 430 couples, either directly or indirectly, access point 400 to a wired network device, such as one of switches 146 or routers 147 of FIGS. 1A, 1B, within the wired network via a cable, such as an Ethernet cable.

First and second wireless interfaces 420A and 420B represent wireless network interfaces and include receivers 422A and 422B, respectively, each including a receive antenna via which access point 400 may receive wireless signals from wireless communications devices, such as UEs 148 of FIGS. 1A, 1B. First and second wireless interfaces 420A and 420B further include transmitters 424A and 424B, respectively, each including transmit antennas via which access point 400 may transmit wireless signals to wireless communications devices, such as UEs 148 of FIGS. 1A, 1B. In some examples, first wireless interface 420A may include a Wi-Fi 802.11 interface (e.g., 2.4 GHz and/or 5 GHZ) and second wireless interface 420B may include a Bluetooth interface and/or a Bluetooth Low Energy (BLE) interface. As described above, AP 400 may request network access for one or more UEs 148 from a nearby NAC system, e.g., NAC system 200 of FIG. 2 or one of NAC systems 180 of FIGS. 1A, 1B.

Processor(s) 406 are programmable hardware-based processors configured to execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of access point 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 stores executable software including an API 440, a communications manager 442, configuration/radio settings 450, a device status log 452, data 454, and log controller 455. Device status log 452 includes a list of events specific to access point 400. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 455 determines a logging level for the device based on instructions from NMS 130. Data 454 may store any data used and/or generated by access point 400, including data collected from UEs 148, such as data used to calculate one or more SLE metrics, that is transmitted by access point 400 for cloud-based management of wireless networks 106A by NMS 130/300.

Input/output (I/O) 410 represents physical hardware components that enable interaction with a user, such as buttons, a display, and the like. Although not shown, memory 412 typically stores executable software for controlling a user interface with respect to input received via I/O 410. Communications manager 442 includes program code that, when executed by processor(s) 406, allow access point 400 to communicate with UEs 148 and/or network(s) 134 via any of interface(s) 430 and/or 420A-420B. Configuration settings 450 include any device settings for access point 400 such as radio settings for each of wireless interface(s) 420A-420B. These settings may be configured manually or may be remotely monitored and managed by NMS 130 to optimize wireless network performance on a periodic (e.g., hourly or daily) basis.

As described herein, AP device 400 may measure and report network data from device status log 452 to NMS 130. The network data may comprise event data, telemetry data, and/or other SLE-related data. The network data may include various parameters indicative of the performance and/or status of the wireless network. The parameters may be measured and/or determined by one or more of the UE devices and/or by one or more of the APs in a wireless network. NMS 130/300 may determine one or more SLE metrics based on the SLE-related data received from the APs in the wireless network and store the SLE metrics as network data 137 (FIG. 1B).

Figure 5:
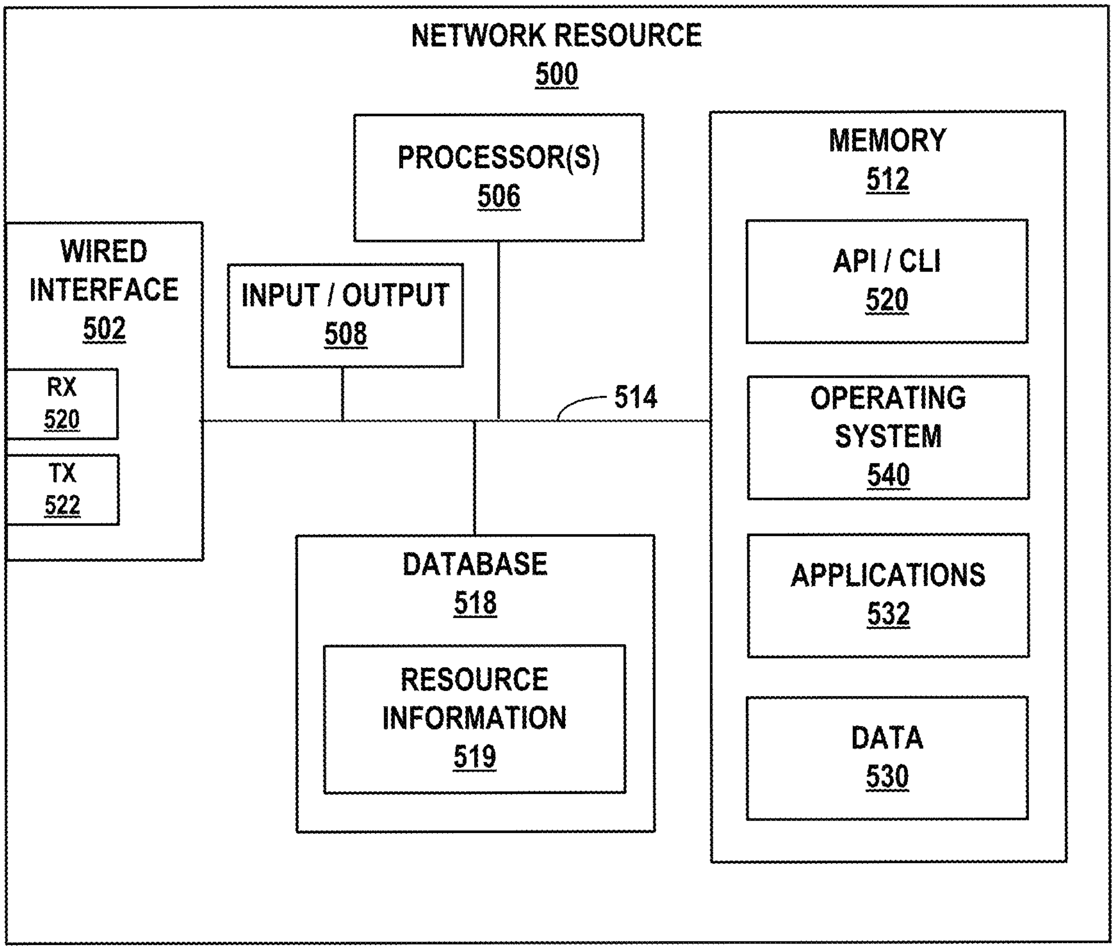
FIG. 5 is a block diagram of an example network resource, in accordance with one or more techniques of this disclosure.

FIG. 5 is a block diagram illustrating an example network resource 500, in accordance with one or more techniques of this disclosure. In one or more examples, network resource 500 implements a device or a server attached to the network 134 of FIG. 1A, e.g., on-premises firewall 114A, cloud-based firewall 114B, switches 146, routers 147, servers 128, or another network device supporting an enterprise network.

In this example, network resource 500 includes a wired interface 502, e.g., an Ethernet interface, a processor 506, input/output 508, e.g., display, buttons, keyboard, keypad, touch screen, mouse, etc., a memory 512, and database 518 coupled together via a bus 514 over which the various elements may interchange data and information. Wired interface 502 couples network resource 500 to a network, such as network 134 shown in FIG. 1A and/or any local area networks. Wired interface 502 represents a physical network interface and includes a receiver 520 and a transmitter 522 for sending and receiving network communications, e.g., packets. Wired interface 502 couples, either directly or indirectly, network resource 500 to any of NAS devices 108. For example, network resource 500 may include multiple wired interfaces 502 and/or wired interface 502 may include multiple physical ports to connect to multiple NAS devices 108 within a site. In some examples, each of the NAS devices 108 connected to network resource 500 may access the wired network via wired interface 502 of network resource 500.

Memory 512 stores an API or command line interface (CLI) 520, executable software applications 532, operating system 540 and data 530. Data 530 may include a system log and/or an error log that stores event data, including behavior data, for network resource 500. In some examples, network resource 500 may collect data 530 and report the data to NMS 130. The data collected and reported by network resource 500 may include periodically reported data and event-driven data. In some examples, network node 500 is configured to collect statistics and/or sample other data according to a periodic interval. Network node 500 may store the collected and sampled data 530 in a buffer.

In some examples, network resource 500 comprises a router or other network device configured to perform firewall services on data traffic of client devices destined for servers or other devices within the enterprise network according to security policies. In other examples, network resource 500 comprises a session-based router that employs a stateful, session-based routing scheme to independently perform path selection and traffic engineering to establish data paths of the client devices according to routing policies. In further examples, network resource 500 may comprise a router, a switch, or another network device configured to transmit data traffic of the client devices according to bandwidth or QoS policies. In still other examples, network resource 500 comprises a switch or other network device supporting an EVPN across multiple sites of the enterprise network to exchange data traffic of the client device and/or supporting multicast traffic to provide data to the client devices.

In accordance with one or more techniques of this disclosure, network resource 500 is provisioned with resource information 519, which includes a mapping of client device identifiers (e.g., IP addresses or hostnames) to certain attributes of the client devices and corresponding network resource policies and/or feature configurations, by a centralized provisioning engine, e.g., NMS 130/300. For example, network resource 500 may receive the resource information 519 via API or CLI 520 and store the resource information 519 in database 518. In addition, network resource 500 may receive updates to resource information 519, including updates to the included client device identifiers and updates to the corresponding policies and/or features configurations, from NMS 130/300. In some examples, resource information 519 may include identifiers of client devices, e.g., IP addresses or hostnames, mapped to certain attributes of the client devices included in fingerprint information. For example, resource information 519 may further comprise mappings to certain policies and/or feature configurations defined for the certain attributes, such as type of client device (e.g., vendor type), type of user of the client device (e.g., user group, user role or title), or type of client device connectivity (e.g., wireless or wired). The policies and/or feature configurations may comprise access policies, security policies, routing policies, QoS policies, data link configurations, logical cluster memberships, or other configuration information for network resource 500.

In response to receipt of data traffic from a client device, network resource 500 may determine which policies and/or feature configurations to apply based only on the identifier of the client device and resource information 519. In this way, network resource 500 may be provisioned to perform fine-grained filtering and policy application to data traffic of client devices, without having access to the fingerprint information of the client devices.

Figure 6:
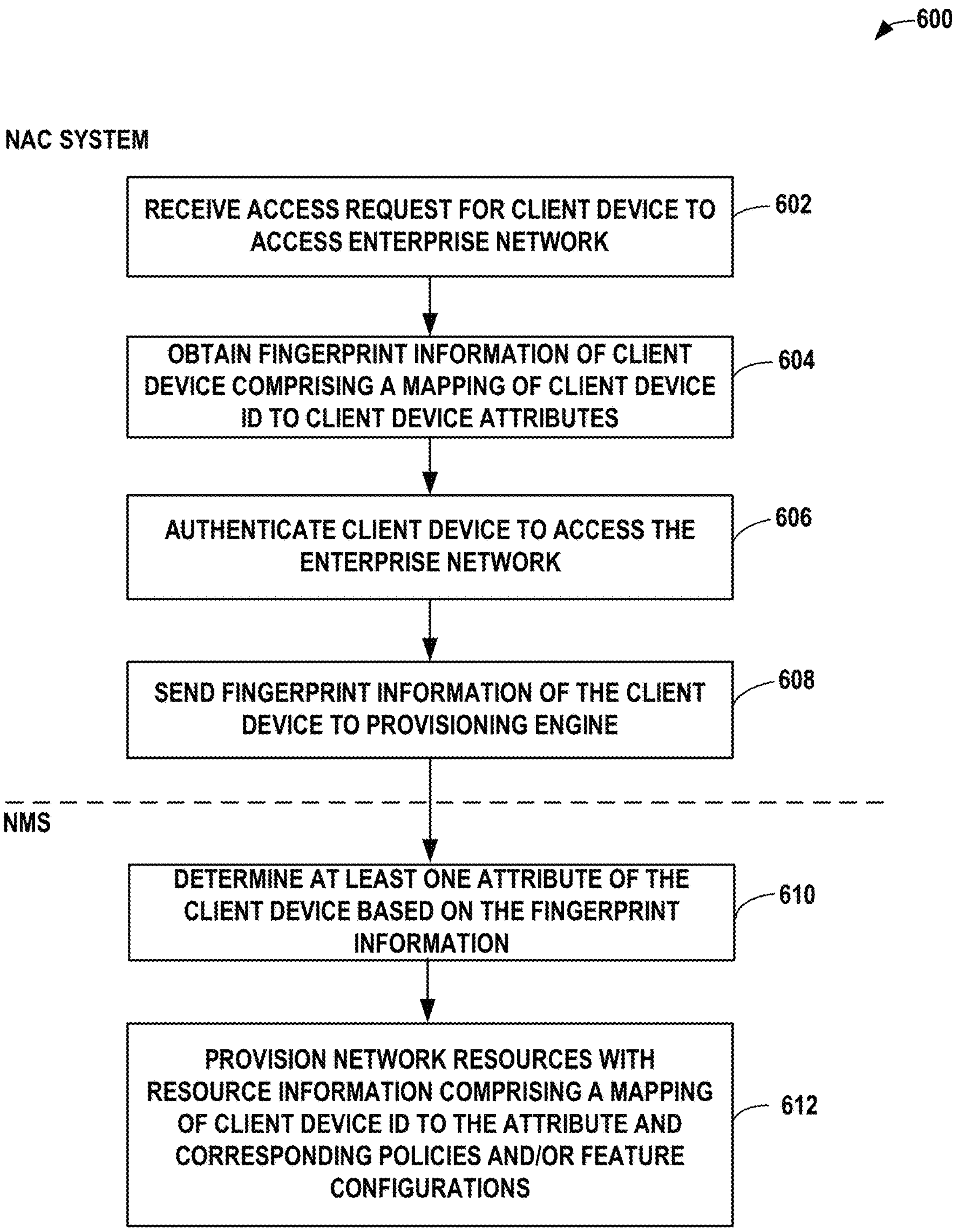
FIG. 6 is a flow chart illustrating an example operation of closed-loop provisioning of network resources based on NAC fingerprinting, in accordance with one or more techniques of this disclosure.

FIG. 6 is a flow chart illustrating an example operation 600 of closed-loop provisioning of network resources based on NAC fingerprinting, in accordance with one or more techniques of this disclosure. The example operation of FIG. 6 is described with respect to NAC systems 180 and NMS 130 of FIGS. 1A-1B. In other examples, the operation of FIG. 6 may be performed by other devices or systems, such as NAC system 200 of FIG. 2 and NMS 300 of FIG. 3.

NAC system 180A, for example, initially receives a network access request for a client device, e.g., client device 148A-1, to access an enterprise wireless network, e.g., wireless network 106A (602). NAC system 180A obtains fingerprint information 182 of client device 148A-1 associated with the network access request (604). The fingerprinting information 182 comprises information specifying one or more attributes associated with client device 148A-1. In some examples, to obtain the fingerprint information 182 of client device 148A-1, NAC system 180A performs a lookup of an identifier of client device 148A-1 in a user directory associated with the enterprise network, e.g., an active directory at AD server 112, and determines, based on the lookup, the one or more attributes associated with client device 148A-1. The fingerprint information 182 of client device 148A-1 comprises a mapping of the identifier of the client device to the one or more attributes associated with the client device. The identifier of client device 148A-1 may comprise one or more of an IP address or a hostname. NAC system 180A authenticates the client device 148A-1 to access the enterprise wireless network 106A (606). NAC system 180A sends the fingerprint information 182 of client device 148A-1 to NMS 130 (608).

After receipt of the fingerprint information 182 of client device 148A-1 from NAC system 180A, NMS 130 provisions one or more network resources 190 associated with client device 148A-1 based on the fingerprint information 182 of client device 148A-1. Network resources 190 may comprise one or more of on-premises firewalls 114A, cloud-based firewalls 114B, switches 146, routers 147, access points 142, or servers 128. More specifically, NMS 130 determines at least one attribute of the one or more attributes associated with client device 148A-1 based on the fingerprint information of client device 148A-1 (610). NMS 130 maintains resource information that comprises a mapping of the identifier of client device 148A-1 to the at least one attribute of client device 148A-1 and at least one network resource policies and/or feature configurations corresponding to the at least one attribute of client device 148A-1. As one example, NMS 130 may identify a user group attribute of client device 148A-1 as specified in the fingerprint information 182 of client device 148A-1, and then include the identifier of client device 148A-1 in the identified user group having corresponding network resource policies and/or feature configurations.

NMS 130 then provisions the one or more network resources 190 with the resource information comprising the mapping of the identifier of client device 148A-1 to the client device attribute and the corresponding network resource policies and/or feature configurations (612). The policies and/or feature configurations may include one or more of access policies, security policies, routing policies, QoS policies, data link configurations, logical cluster memberships, or other configuration information policies. In one example, to provision a network resource, NMS 130 updates an existing user group of the one or more user groups at the network resource to include the identifier of client device 148A-1, where at least one policy previously provisioned at the network resource corresponds to the existing user group. In another example, to provision a network resource, NMS 130 provisions the network resource with a new user group that includes the identifier of client device 148A-1 and a new policy corresponding to the new user group. In some examples, NMS 130 periodically updates the resource information at a network resource to remove identifiers of one or more client devices that are no longer using the network resource.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:

analyzing, by a first network system, network behavior of a client device to obtain fingerprint information including attribute information of the client device, wherein the network behavior of the client device occurs during a network access request by the client device to access a network;

based on the attribute information of the client device obtained from the first network system, determining, by a second cloud-based network system, a mapping of an identifier of the client device to the attribute information of the client device and a corresponding network policy; and automatically provisioning, by the second cloud-based network system, one or more network resources with the mapping, wherein the one or more network resources comprise one or more network devices in a data path between the client device and the network.

2. The method of claim 1, wherein obtaining the fingerprint information comprises:

performing a lookup of an identifier of the client device in a user directory associated with the enterprise network; and determining based on the lookup, one or more attributes associated which the client device.

3. The method of claim 1, wherein the attribute information of the client device comprises the mapping of the identifier of the client device to one or more attributes associated with the client device.

4. The method of claim 1, wherein automatically provisioning the one or more network resources comprises:

determining at least one attribute of one or more attributes associated with the client device based on the attribute information; and automatically provisioning the one or more network resources with the mapping of the identifier of the client device to the at least one attribute of the client device and the corresponding network policy.

5. The method of claim 4, wherein determining the at least one attribute associated with the client device comprises:

identifying a user group attribute associated with the client device as specified in the attribute information of the client device; and including the identifier of the client device in the identified user group.

6. The method of claim 5, wherein automatically provisioning a network resource of the one or more network resources comprises updating an existing user group at the network resource to include the identifier of the client device, wherein the corresponding network policy corresponds to the existing user group.

7. The method of claim 5, wherein automatically provisioning a network resource of the one or more network resources comprises provisioning the network resource with a new user group that includes the identifier of the client device and a new network policy corresponding to the new user group.

8. The method of claim 4, further comprising periodically updating the mapping at a network resource of the one or more network resources to remove identifiers of one or more client devices that are no longer using the network resource.

9. The method of claim 1, wherein the one or more network resources comprise a first firewall and a second firewall that are in the data path of the client device to the network, and wherein automatically provisioning the one or more network resources comprises:

determining an address group to which the client device belongs based on the attribute information;

provisioning the first firewall with an address group that includes an address of the client device and a policy corresponding to the address group; and provisioning the second firewall with the same address group that includes an identifier of the client device and the same policy corresponding to the address group.

10. The method of claim 1, wherein the identifier of the client device comprises one or more of an Internet protocol (IP) address or a hostname.

11. The method of claim 1, wherein the one or more network resources comprise one or more of on-premises firewalls, cloud-based firewalls, switches, routers, access points, or servers.

12. A system comprising:

memory; and processing circuitry in communication with the memory and configured to:

analyze, network behavior of a client device to obtain fingerprint information including attribute information of the client device, wherein the network behavior of the client device occurs during a network access request by the client device to access a network;

based on the attribute information of the client device, determine a mapping of an identifier of the client device to the attribute information of the client device and a corresponding network policy; and automatically provision one or more network resources path with the mapping, wherein the one or more network resources comprise one or more network devices in a data path between the client device and the network.

13. The system of claim 12, wherein to obtain the fingerprint information, the processing circuitry is configured to:

perform a lookup of an identifier of the client device in a user directory associated with the enterprise network; and determine, based on the lookup, one or more attributes associated with the client device.

14. The system of claim 12, wherein the attribute information of the client device comprises the mapping of the identifier of the client device to one or more attributes associated with the client device.

15. The system of claim 12, wherein to automatically provision the one or more network resources, the processing circuitry is configured to:

determine at least one attribute of one or more attributes associated with the client device based on the attribute information; and automatically provision the one or more network resources with the mapping of the identifier of the client device to the at least one attribute of the client device and the corresponding network policy.

16. The system of claim 15, wherein, to determine the at least one attribute associated with the client device, the processing circuitry is configured to:

identify a user group attribute associated with the client device as specified in the attribute information of the client device; and include the identifier of the client device in the identified user group.

17. The system of claim 16, wherein to automatically provision a network resource of the one or more network resources, the processing circuitry is configured to update an existing user group at the network resource to include the identifier of the client device, wherein the corresponding network policy corresponds to the existing resource group.

18. The system of claim 16, wherein to automatically provision a network resource of the one or more network resources, the processing circuitry is configured to provision the network resource with a new user group that includes the identifier of the client device and a new network policy corresponding to the new user group.

19. The system of claim 15, wherein the processing circuitry is configured to periodically update the mapping at a network resource of the one or more network resources to remove identifiers of one or more client devices that are no longer using the network resource.

20. Non-transitory computer-readable storage media storing instructions that when executed causes processing circuitry to:

analyze, network behavior of a client device to obtain fingerprint information including attribute information of the client device, wherein the network behavior of the client device occurs during a network access request by the client device to access a network; and based on the attribute information of the client device, determine a mapping of an identifier of the client device to the attribute information of the client device to a corresponding network policy; and automatically provision one or more network resources with the mapping, wherein the one or more network resources comprise one or more network devices in a data path between the client device and the network.

* * * * *